United States Patent
Nagashima

(10) Patent No.: US 8,319,896 B2
(45) Date of Patent: Nov. 27, 2012

(54) IMAGE PROCESSING APPARATUS AND METHOD FOR CONTROLLING IMAGE PROCESSING APPARATUS

(75) Inventor: Yoshiyuki Nagashima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 109 days.

(21) Appl. No.: 12/873,676

(22) Filed: Sep. 1, 2010

(65) Prior Publication Data

US 2011/0058105 A1    Mar. 10, 2011

(30) Foreign Application Priority Data

Sep. 7, 2009   (JP) ................................. 2009-205620
May 26, 2010   (JP) ................................. 2010-120147

(51) Int. Cl.
*H04N 5/58* (2006.01)
*H04N 9/73* (2006.01)

(52) U.S. Cl. ....................................... 348/602; 348/655

(58) Field of Classification Search .................. 348/602, 348/603, 655–658, 687, 688; 345/84, 102, 345/101, 207, 690; *H04N 5/58, 9/73, 5/57*
See application file for complete search history.

(56) References Cited

U.S. PATENT DOCUMENTS

2004/0223007 A1   11/2004   Mamata
2009/0167950 A1*  7/2009   Chen et al. .................... 348/602

FOREIGN PATENT DOCUMENTS

JP    2004-279503 A    10/2004

* cited by examiner

*Primary Examiner* — Sherrie Hsia
(74) *Attorney, Agent, or Firm* — Carter DeLuca Farrell & Schmidt, LLP

(57) ABSTRACT

The control unit provided in the image processing apparatus determines, based on the measurement result obtained by the time measurement unit, whether or not a change timing of external light detected and determined by the external light detection unit and the external light change determination unit is before a predetermined time has elapsed since the input switching detection unit detected the switching process. When the change timing of external light is before a predetermined time threshold value Th1 has elapsed as a result of the determination, the control unit provides instructions to the image processing unit about executing image quality adjustment processing while increasing the adjustment amount per unit time.

8 Claims, 5 Drawing Sheets

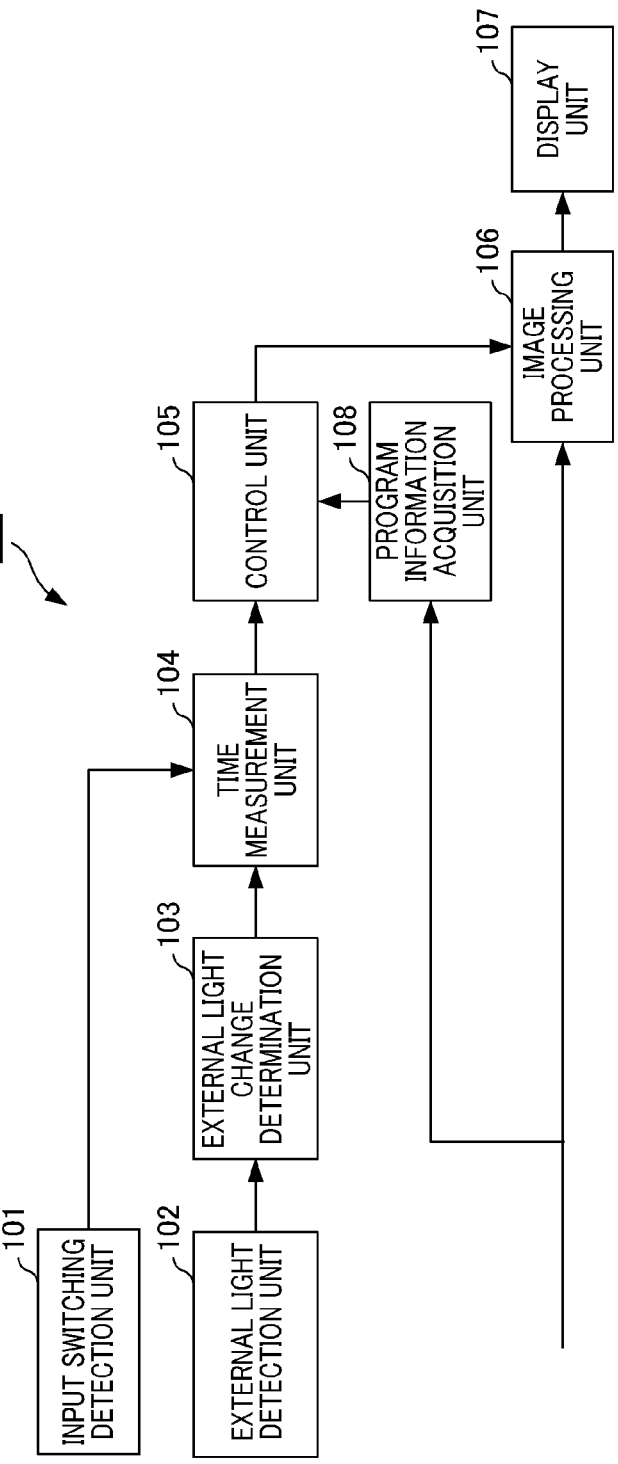

IMAGE PROCESSING APPARATUS AND METHOD FOR CONTROLLING IMAGE PROCESSING APPARATUS

BACKGROUND OF THE INVENTION

1. Field of the Invention

The present invention relates to an image processing apparatus and a method for controlling the image processing apparatus.

2. Description of the Related Art

When a user views an image by using an image display apparatus such as a television apparatus (hereinafter referred to as "television"), the image needs to be an easily viewed image quality depending on the ambient brightness or the lighting environment. For example, when the ambient area of a television screen is dark, an image becomes easy to view when the image is displayed with a reduced brightness. On the other hand, when the ambient area of a television screen is bright, an image becomes easy to view when the image is displayed with an increased brightness. This is not limited to the ambient brightness but is similarly applied to the color temperature surrounding a television screen. When the color temperature of the ambient area of a television screen is low, an image becomes easy to view when the image is also displayed with a decreased color temperature. On the other hand, when the color temperature of the ambient area of a television screen is high, an image becomes easy to view when the image is also displayed with an increased color temperature. Therefore, it is contemplated that the quality of an image displayed on a television screen be automatically adjusted depending on the brightness or color temperature surrounding the television screen.

However, a television is often used in a situation where the environment surrounding a television screen frequently changes. More specifically, a television may be used in the environment where the incidence of sunlight entering a room in which the television is installed may change, such as switching lighting, opening and closing a curtain, or the like. When image quality is automatically adjusted depending on brightness surrounding the television screen in the environment, the image quality of the television screen may be frequently switched following the frequent change in the surrounding environment, resulting in discomfort to the user.

Japanese Patent Laid-Open No. 2004-279503 discloses a technique in which the ambient illuminance of a television is detected to determine the display brightness of the television depending on the detected illuminance so that the display brightness is changed to the determined display brightness in a plurality of steps.

However, in the technique disclosed in Japanese Patent Laid-Open No. 2004-279503, the display brightness is changed in a plurality of steps. Consequently, when the ambient brightness is changed, it is time-consuming to switch an image to an optimum image quality. This produces the effect of reducing user discomfort caused by a sudden change in image quality. However, for example, when a user switches a channel to a movie program and intentionally dims an illumination immediately after the channel switching in order to make the image of the movie program easy to see, a problem occurs with the aforementioned technique. In such a case, the technique disclosed in Japanese Patent Laid-Open No. 2004-279503 requires time until an image can be displayed with the image quality adapted for dark illumination after a user has intentionally dimmed the illumination. In other words, regardless of the case where a user has intentionally changed the ambient brightness or color temperature or the case where a user has unintentionally changed the same, the technique disclosed in Japanese Patent Laid-Open No. 2004-279503 always changes the image step-by-step with a constant degree of change. With such a control, it is difficult to say that appropriate control corresponding to a user's intention is carried out.

SUMMARY OF THE INVENTION

The image processing apparatus according to an aspect of the present invention is an image processing apparatus that performs image quality adjustment processing on an image signal depending on ambient external light. The image processing apparatus includes an external light detection unit configured to detect external light information including at least ambient illuminance or color temperature of the image processing apparatus so as to determine a change in ambient external light depending on the detected external light information, a switching detection unit configured to detect any one of the switching processes among switching the input of an image signal, channel switching, and broadcast program switching to the image processing apparatus, a measurement unit configured to measure the time that has elapsed since the switching process has been detected by the switching detection unit, a control unit configured to determine a target setting value to be used for image processing for displaying the image signal with an image quality corresponding to the changed external light, when the external light detection unit recognizes that ambient external light has been changed, and an image processing unit configured to execute image quality adjustment processing of the image step-by-step by using the target setting value determined by the control unit and an image quality adjustment amount per unit time until the image reaches an image quality corresponding to the target setting value. The control unit determines based on the measurement result obtained by the measurement unit whether or not a change timing of external light detected by the external light detection unit is before a predetermined time has elapsed since the switching detection unit detected the switching process, and when the change timing of external light is before the predetermined time has elapsed as a result of the determination, provides instructions to the image processing unit about executing image quality adjustment processing while increasing the adjustment amount per unit time.

Further features of the present invention will become apparent from the following description of exemplary embodiments with reference to the attached drawings.

BRIEF DESCRIPTION OF THE DRAWINGS

FIG. 4A is a diagram illustrating an example of the configuration of an image processing apparatus 200 according to a second embodiment of the present invention.

FIG. 4B is a diagram illustrating an example of genre determination information.

DESCRIPTION OF THE EMBODIMENTS

Figure 1:
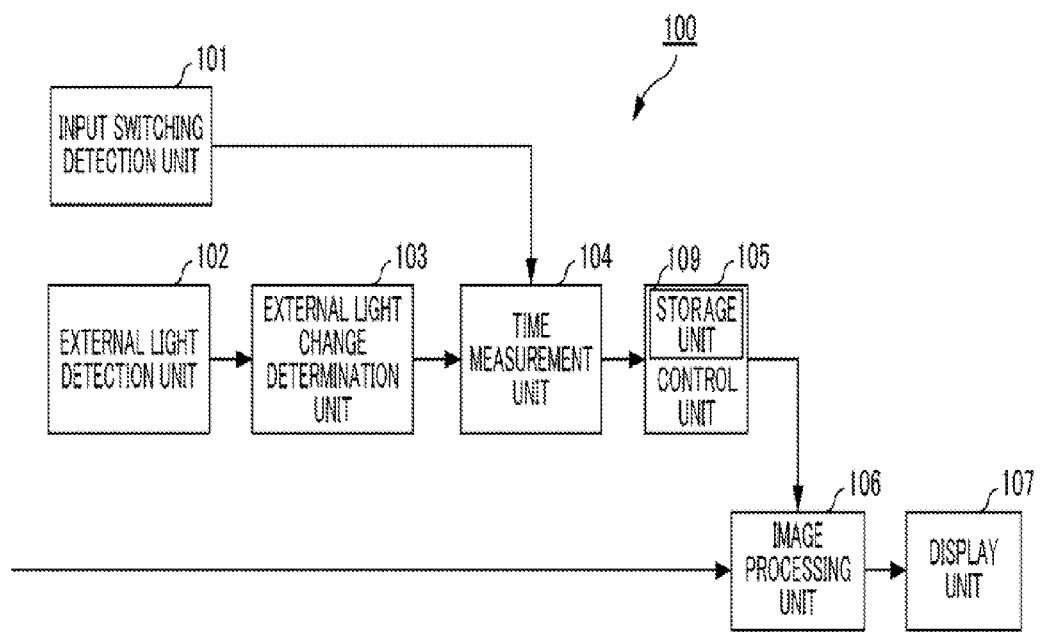
FIG. 1 is a diagram illustrating an example of the configuration of an image processing apparatus according to a first embodiment of the present invention.

FIG. 1 is a diagram illustrating an example of the configuration of an image processing apparatus according to a first embodiment of the present invention. An image processing apparatus 100 shown in FIG. 1 is an image processing apparatus that can perform image quality adjustment processing with respect to an image signal step-by-step depending on ambient external light. The image processing apparatus 100 is, for example, a television. The image processing apparatus 100 includes an input switching detection unit 101, an external light detection unit 102, an external light change determination unit 103, a time measurement unit 104, a control unit 105, an image processing unit 106, and a display unit 107. The input switching detection unit 101 detects execution of switching an image signal to be input (an input signal) and execution of a channel selection operation (channel switching), and transmits the detected results to the time measurement unit 104 as signal switching information. Examples of switching an image signal include switching from an image signal output from a recorder connected to the image processing apparatus 100 to a broadcast signal received by a television, and the like. Also, the channel switching is, for example, a process for switching a channel being viewed by a user. Note that the input switching detection unit 101 is intended to be able to execute these switching operations, but also detects broadcast program switching. A broadcast program switching does not cause signal switching and channel switching, but is in the state in which a currently-broadcast program on a certain channel ends and then a new program broadcast starts. In other words, the input switching detection unit 101 is a switching detection unit configured to detect any one of switching processes among switching the input of an image signal, channel switching, and broadcast program switching to the image processing apparatus 100.

The external light detection unit 102 periodically detects the ambient illuminance of the image processing apparatus 100, and transmits the detected light to the external light change determination unit 103 as external light information. For ease of illustration, external light to be detected by the external light detection unit 102 is taken as the ambient illuminance (brightness) in the present embodiment. However, the present invention is not limited to brightness, and color temperature may be detected. Also, the external light detection unit 102 may detect illuminance and color temperature together. In other words, the external light detection unit 102 detects external light information including at least ambient illuminance or color temperature of the image processing apparatus 100. Even if there is no change in external light or the degree of change in illuminance is smaller than the predetermined prescribed value, the detection of illuminance is implemented continuously. The external light change determination unit 103 receives external light information from the external light detection unit 102, and calculates the amount of change in external light, which indicates the magnitude of the change in the illuminance around the image processing apparatus 100, based on the received external light information. The amount of change in external light (illuminance) can be calculated by determining the difference between the external light information that has already been detected and the external light information that is being currently detected.

Then, the external light change determination unit 103 compares the calculated amount of change in external light with the determination threshold value of the amount of change in external light that is set in a circuit in advance. When the amount of change in external light is greater than the determination threshold value, the external light change determination unit 103 determines that external light has been changed, i.e., the illuminance around the image processing apparatus 100 has been changed. In order to adjust an image quality corresponding to the changed external light, external light information indicating the current illuminance is output to the control unit 105. In other words, both the external light detection unit 102 and the external light change determination unit 103 function as an external light detection unit configured to detect external light information so as to determine the change in ambient external light depending on the detected external light information.

The time measurement unit 104 functions as a timer that receives signal switching information from the input switching detection unit 101 and measures the time that has elapsed since the signal switching information has been received. The time measurement unit 104 successively measures the time elapsed since the signal switching information has been received so as to always output the measured time to the control unit 105. When new signal switching information is received during measuring, the measured time until new signal switching information is received is reset to thereby start measuring time again. In other words, the time measurement unit 104 functions as a measurement unit configured to measure the time that has elapsed since a switching process has been detected by the switching detection unit (the input switching detection unit 101).

When the external light change determination unit 103 recognizes that ambient external light has been changed, the control unit 105 determines the target brightness value (target setting value) corresponding to the external light by using the external light information output from the external light change determination unit 103. The target brightness value corresponds to the brightness value of an image to be displayed on the display unit 107 in the image processing apparatus 100. The target setting value is used for image processing for displaying an image signal with an image quality corresponding to the changed external light. The target brightness value is predefined depending on the ambient illuminance, and is stored in a storage unit 109 in the control unit 105 as table data. The relationship of correspondence between the illuminance around the image processing apparatus 100 and the brightness value of an image to be displayed on the display unit 107 is specified. For example, when the illuminance is 400 Lux, the brightness value is 150 Candela. Although the present embodiment assumes that an image quality is to be adjusted such that the brightness of the displayed image data itself becomes the target brightness value, the brightness of the displayed image can be adjusted by controlling the backlight or the like of the display unit 107 for displaying image data. For other parameters such as color temperature or the like, excluding brightness, the target setting value corresponding to each content to be adjusted will be defined as the color temperature of the target (target color temperature).

The control unit 105 determines the target brightness value corresponding to the external light information based on table data by using external light information output from the external light change determination unit 103, and adjusts the brightness value of image data such that image is displayed with the determined target brightness value. At this time, the brightness value of image data is generally not immediately switched to the target brightness value, but is controlled such that the brightness value is temporarily switched to a brightness value between the current brightness value and the target brightness value to approach the target brightness value step-by-step. More specifically, when image data is constituted at 60 frame images per second, the brightness value may be changed by three-frame units. At this time, it is usual that the amount of change in the brightness value to be changed (the adjustment amount per unit time) is also changed at the predefined fixed value. For example, the brightness value of image data is adjusted so as to approach the target brightness value step-by-step by the adjustment amount of 1 Candela per three-frame unit.

However, as described above, immediately after switching the input of an image signal or switching a channel, a user may intentionally change the ambient illuminance. For example, a user brightens a room in order to view a sports program. This is because a sport program may have many brightly-colored images and watching it with a sharp-edged brightness can thereby provide a high degree of realism to a user. However, when a user switches a channel for the purpose of viewing a movie, the user often dims room lights. This is because watching a movie in a dark room is preferred, if possible, as is apparent from the fact that a movie theater provides a dark environment. Hence, when an image is switched from a sport program to a movie program and a user immediately dims the room lights thereafter, a significant change in illuminance occurs, and thus, the brightness value of the image should also be changed by a large amount.

As described above, in a normal image quality adjustment, the control unit 105 performs an adjustment operation such that the brightness value of the image becomes the target brightness value by the adjustment amount per unit time. However, when a user intentionally changes the illuminance immediately after the image switching, it is desirable that such a change be adjusted to become the image quality corresponding to the illuminance as quickly as possible. This is because a user wants to enjoy watching the program of the user's interest at the illuminance suitable for the same.

In light of the above, the control unit 105 determines whether or not a change in external light has occurred before the time elapsed from the occurrence of the signal switching reaching the predetermined time threshold value Th1. When a change in external light has occurred before the elapsed time reaches the time threshold value Th1, the control unit 105 controls the image quality adjustment such that the adjustment amount per unit time becomes greater than that in the normal case to thereby achieve the target brightness value in a short time. The normal case refers to a case where a change in external light has occurred since the time equal to or greater than the time threshold value Th1 elapsed. In this case, as described above, the image quality is adjusted by the adjustment amount of 1 Candela per three-frame unit, for example. For the convenience of explanation, this adjustment amount is referred to as the "adjustment amount A1". In contrast, when a change in external light has occurred before the elapsed time reaches the time threshold value Th1, the control unit 105 performs an image quality adjustment by the adjustment amount of 10 Candela per three-frame unit, for example. For the convenience of explanation, this adjustment amount is referred to as the "adjustment amount A2" (A1<A2). In this case, the target brightness value can be obtained tenth times faster than the normal case.

The control unit 105 outputs image quality control information including target brightness value information of image processing for an image signal to be executed by the image processing unit 106 to the image processing unit 106. It should be noted, however, that when the adjustment amount per unit time needs to be increased, the image quality control information including instructions about increasing the adjustment amount per unit time is output. In other words, this instruction means to adjust image quality by using the adjustment amount A2. In other words, based on the measurement result obtained by the time measurement unit 104, the control unit 105 determines whether or not a change timing of external light detected by the external light detection unit is before a predetermined time has elapsed since the input switching detection unit 101 detected the switching process. When the change timing of external light is before the predetermined time has elapsed as a result of the determination, the control unit 105 provides instructions to the image processing unit 106 about executing image quality adjustment processing while increasing the adjustment amount per unit time.

The image processing unit 106 receives an image signal (image data) that is input to the image processing apparatus 100. Also, the image processing unit 106 receives the image quality control information output by the control unit 105, and executes image quality adjustment processing on the image signal in accordance with the image quality control information. The image signal of which the image quality has been adjusted is output to the display unit 107 and thereby displayed on a screen. In the present embodiment, the image processing unit 106 performs processing for adjusting the brightness value of an image signal to be the target brightness value included in the image quality control information. As described above, in the brightness value adjustment performed by the image processing unit 106, the brightness value is not immediately changed to the target brightness value, but is processed such that the brightness value reaches the target brightness value step-by-step in accordance with the adjustment amount A1 or A2 per unit time. In other words, the image processing unit 106 is an image processing unit configured to execute image quality adjustment processing of an image step-by-step by using the target setting value determined by the control unit 105 and an image quality adjustment amount per unit time until the image reaches an image quality corresponding to the target setting value. A method for controlling the image processing apparatus of the present embodiment is realized by the function of a processing unit provided in the image processing apparatus 100 shown in FIG. 1.

Figure 2:
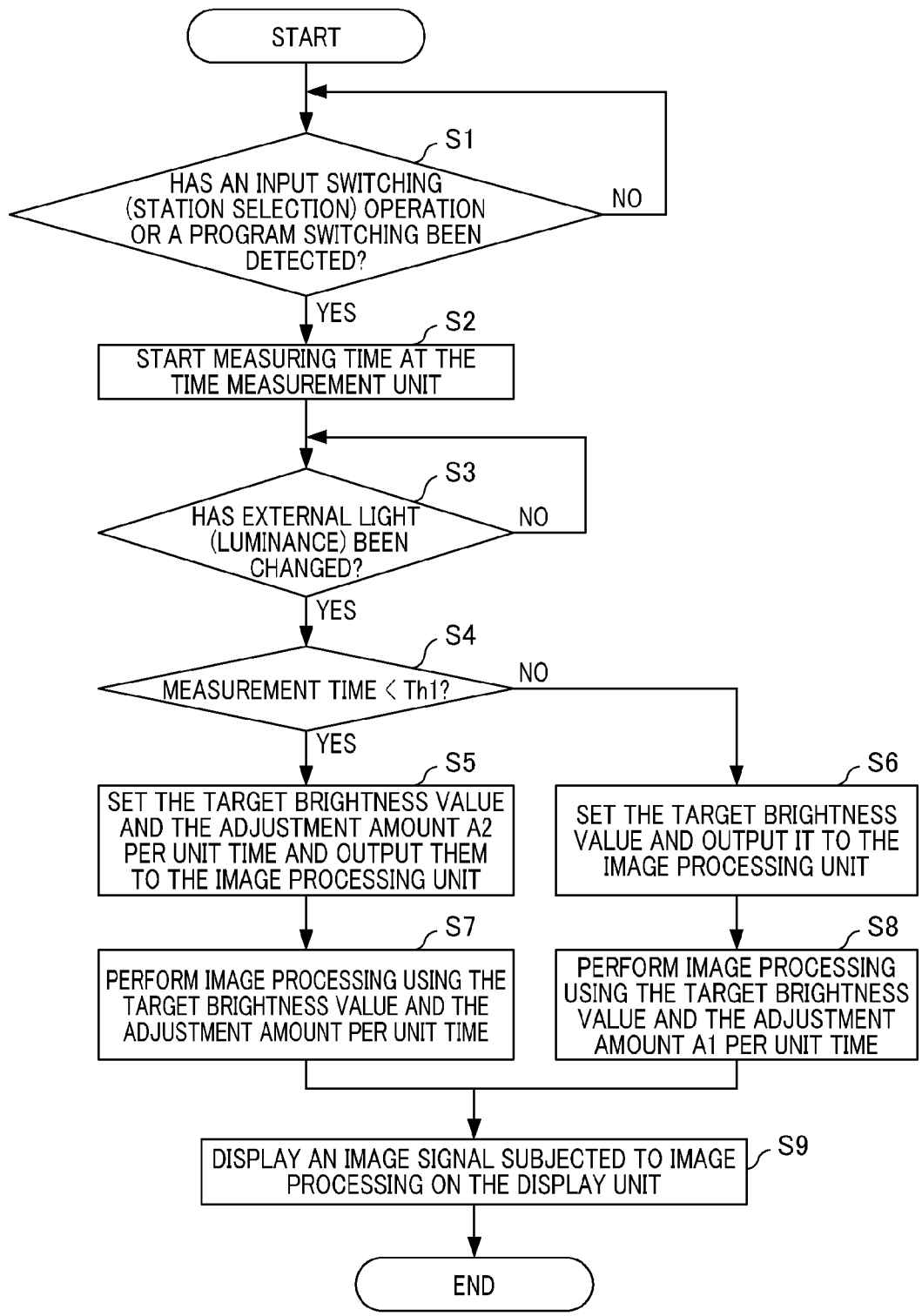
FIG. 2 is a diagram illustrating the operation processing performed by the image processing apparatus according to the first embodiment.

FIG. 2 is a diagram illustrating operation processing performed by the image processing apparatus 100 according to a first embodiment of the present invention. FIG. 2 is a diagram illustrating an example of an operation processing flow performed by the image processing apparatus. After turning on the power of the image processing apparatus shown in FIG. 1, the input switching detection unit 101 determines whether or not a user-operated switching of an input signal (input switching), channel switching, or broadcast program switching has been detected in step S1 shown in FIG. 2 (step S1). When no input signal switching has been detected, the input switching detection unit 101 continues a detection operation. When the input switching detection unit 101 has detected the input signal switching, the input switching detection unit 101 transmits the signal switching information to the time measurement unit 104, and the process advances to step S2.

Next, the time measurement unit 104 resets the time measured up to that time to thereby start measuring time again. The time being measured is always output to the control unit 105 (step S2). Next, the external light change determination unit 103 acquires external light information indicating the illuminance around the image processing apparatus 100 to thereby determine whether or not external light (illuminance) has been changed (step S3). The external light detection unit 102 periodically detects external light. By using the detected results, the external light change determination unit 103 recognizes whether or not a change in external light has occurred. The changed ambient illuminance is output to the control unit 105.

When the control unit 105 receives an input indicating that the illuminance has been changed from the external light change determination unit 103, the control unit 105 determines whether or not the elapsed time at the time point at which the input has occurred reaches the predetermined time threshold value Th1 (step S4). When the elapsed time is shorter than the time threshold value Th1, the control unit 105 advances the process to step S5. When the elapsed time is equal to or longer than the time threshold value Th1, the control unit 105 advances the process to step S6.

In step S5, the control unit 105 determines the target brightness value based on the external light information input from the external light change determination unit 103 to thereby output image quality control information including the target brightness value and instructions about increasing the adjustment amount per unit time to the image processing unit 106. Then, the image processing unit 106 executes image quality adjustment processing using the predefined adjustment amount A2 per unit time such that the brightness value of an image signal is to be the target brightness value of the image quality control information output from the control unit 105 (step S7), and the process advances to step S9.

In contrast, in step S6, the control unit 105 determines the target brightness value based on the external light information input from the external light change determination unit 103, and then outputs image quality control information including the target brightness value to the image processing unit 106, and the process advances to step S8. It should be noted that while in the present embodiment, instructions regarding the adjustment amount per unit time are not included in the image quality control information, instruction information indicating the adjustment using the normal adjustment amount may of course be included.

In step S8, the image processing unit 106 executes image quality adjustment processing using the predefined adjustment amount A2 per unit time such that the brightness value of an image signal is to be the target brightness value of the image quality control information output from the control unit 105, and the process advances to step S9. In step S9, image data of which the illuminance has been adjusted by the image processing unit 106 is output to and displayed on the user-viewable display unit 107.

While description has been made of a control operation according to the present embodiment, image quality adjustment processing of the present invention will now be described with reference to FIGS. 3A to 3C, each of which is a schematic diagram for explaining what kind of adjustment is actually made by the control operation.

Figure 3A:
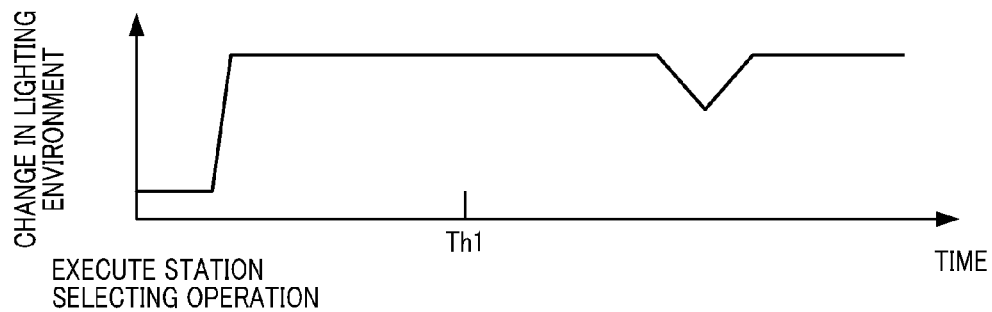
FIG. 3A to 3C are diagrams illustrating the state of control according to the first embodiment.

FIG. 3A is a diagram illustrating changes in the illuminance around the image processing apparatus 100. In FIG. 3A, a predetermined range of a change in illuminance since a user executed a channel switching (channel selection operation) is plotted on the horizontal axis, which serves as a time axis, for ease of description.

Figure 3B:
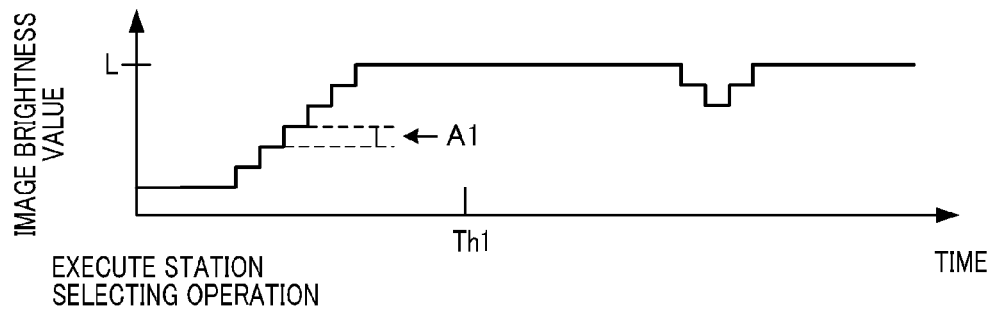

FIG. 3B is a diagram illustrating the transition state of the image quality adjustment result obtained by applying conventional image quality adjustment processing, when a change in illuminance as shown in FIG. 3A has occurred. Time is plotted on the horizontal axis, and a setting value (image brightness value) of illuminance to be applied to images is plotted on the vertical axis. As is apparent from FIG. 3B, the image brightness value is adjusted step-by-step corresponding to a change in illuminance until it reaches the target brightness value L.

Figure 3C:
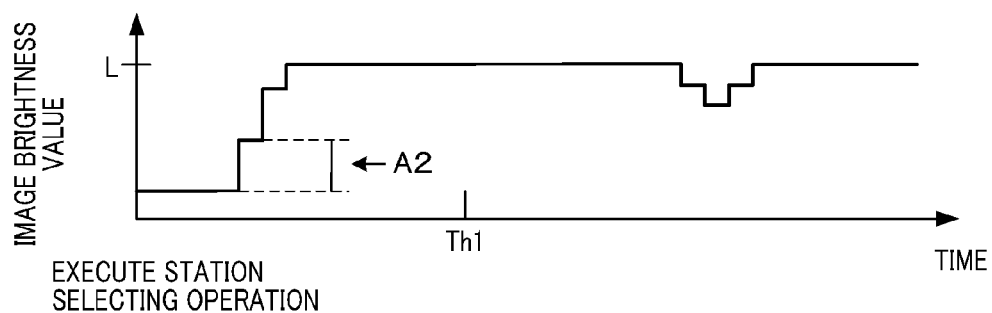

On the other hand, FIG. 3C is a diagram illustrating the transition state of the image quality adjustment result obtained by applying the image quality adjustment processing of the present invention. Since a change in illuminance occurs before the threshold value Th1 elapses, the image brightness value is adjusted by using the adjustment amount A2. When the adjustment amount A2 is used for adjustment and the image brightness value exceeds the target brightness value L, the image brightness value is limited at the time point at which it reaches the target brightness value L. On the other hand, when a change in illuminance occurs after the threshold value Th1, image quality adjustment processing is executed by using the adjustment amount A1.

The image processing apparatus of the present embodiment described above executes the following processing in order to perform image quality adjustment processing on an image signal step-by-step in accordance with a change in the lighting environment. The image processing apparatus increases the adjustment amount per unit time so as to reduce the adjustment time for image quality suitable for the lighting environment after the change, when a user performs channel switching or when a user intentionally changes the lighting environment within a predetermined time after the change of the program that is currently being viewed. Consequently, the image quality can be quickly shifted to the image state desired by the user, resulting in an increase in convenience to the user.

It should be noted that when a change in illuminance occurs before the time reaches the time threshold value Th1, the image quality can be adjusted by changing directly to the target brightness value, and not by step-by-step adjustment. However, it is difficult to say that this is preferred because a change in image quality is noticeable to a user. The present invention assumes that image quality is intended to be adjusted step-by-step, so that quick adjustment can be ensured without causing a user discomfort.

While in the aforementioned first embodiment, a single time threshold value Th1 is set, there is not necessarily one time threshold value in the present invention. In other words, a plurality of time threshold values may be set for more flexible adjustment. For example, Th2 is set as the time threshold value which is longer than the time threshold value Th1. When the time from image signal switching to illuminance change is longer than Th1 but shorter than Th2, illuminance adjustment processing may be executed by using the third adjustment amount A3 that is greater than the adjustment amount A1 but smaller than A2. The adjustment amount may be defined such that a plurality of predetermined times (time threshold values) to be compared with the change timing of illuminance is specified and the adjustment value per unit time corresponding to the predetermined time becomes smaller as each predetermined time becomes longer (the same goes for the second embodiment).

Next, the image processing apparatus according to the second embodiment of the present invention will now be described. The image processing apparatus 200 (FIG. 4A) according to the second embodiment determines whether or not a user has intentionally changed the light, based on information indicating genre of a program switched by input switching, channel selection operation, or program switching, and the degree of change in the lighting environment. The image processing apparatus 200 adjusts the adjustment amount per unit time in accordance with the determination result. The present embodiment is intended to increase accuracy for determining whether or not a user has intentionally changed the light. An example in which the image processing apparatus 200 acquires the genre of the program being broadcast to thereby determine whether or not a user has intentionally changed the light based on the acquired program genre will now be described: It should be noted that in the present invention, information to be acquired by the image processing apparatus 200 is not limited to the genre of the program being broadcast. Hence, The image processing apparatus 200 not only acquires genre information from a broadcast wave, but also acquires information indicating the image contents from any image signal to thereby determine whether or not a user has intentionally changed the light based on information indicating the acquired image contents.

FIG. 4 is a diagram illustrating an example of the configuration of an image processing apparatus according to the second embodiment of the present invention, and an example of genre determination information. FIG. 4A shows an example of the configuration of the image processing apparatus 200 according to the second embodiment of the present invention. The image processing apparatus 200 shown in FIG. 4A includes the processing units provided in the image processing apparatus 100 of the first embodiment of the present invention shown in FIG. 1 and a program information acquisition unit 108. Among the processing units provided in the image processing apparatus 200 shown in FIG. 4A, the processing units represented by the same numbers as the processing units provided in the image processing apparatus 100 shown in FIG. 1 have functions equivalent to the processing units provided in the image processing apparatus 100 shown in FIG. 1. The method for controlling an image processing apparatus of the present embodiment is realized by the functions of processing units provided in the image processing apparatus 200 shown in FIG. 4A.

The program information acquisition unit 108 acquires the program genre of an image signal from an input image signal 112, and successively transmits information including the acquired program genre, as genre information 120, to the control unit 105. In other words, the program information acquisition unit 108 functions as an acquisition unit configured to acquire genre information indicating the type of the contents of an image signal to be applied for image quality adjustment processing.

As in the first embodiment, the control unit 105 determines whether or not a change in external light has occurred before the time elapsed from the occurrence of the signal switching reaches the predetermined time threshold value Th1. When a change in external light occurs, the process for determining the adjustment amount per unit time for the illuminance adjustment on an image signal using genre determination information, to be described below, is performed in accordance with genre information input from the program information acquisition unit 108. Then, image quality control information including the determined adjustment amount per unit time and the target brightness value is output to the image processing unit 106.

The image processing unit 106 that has received the image quality control information performs image quality adjustment (brightness value adjustment for an image signal) processing so as to achieve the target brightness value directed by the control unit 105. As in the first embodiment, the present embodiment is configured such that the brightness value is not immediately changed to the target brightness value, but is changed step-by-step in accordance with the adjustment amount per unit time.

FIG. 4B shows an example of genre determination information. Genre determination information is table data in which the program genre after the input switching/station selection is associated with the rate of change from the ambient illuminance immediately before the input switching/station selection. Genre determination information is stored in a memory 109 that is accessible to the control unit 105. For example, when the program genre after input switching/station selection is a movie, the brightness value is associated with the condition value of which the illuminance is reduced by 40% or more of the ambient brightness value immediately before input switching/station selection. In other words, the memory 109 is a storage unit configured to store determination information associating the condition value of the rate of change in external light with genre information. In other words, when a change of more than the rate of change in illuminance associated with each genre of a newly-displayed program by a station selection operation or the like occurs within a predetermined prescribed time (the threshold value Th1), the genre determination information is utilized for increasing the adjustment amount per unit time to obtain the target brightness value. More specifically, the control unit 105 executes the following processing, when the change timing of external light is before the predetermined time has elapsed and the rate of change in external light before and after the switching process meets a condition value corresponding to genre information of the image signal after switching. The control unit 105 provides instructions to the image processing unit 106 about executing image quality adjustment processing while increasing the adjustment amount per unit time.

Figure 5:
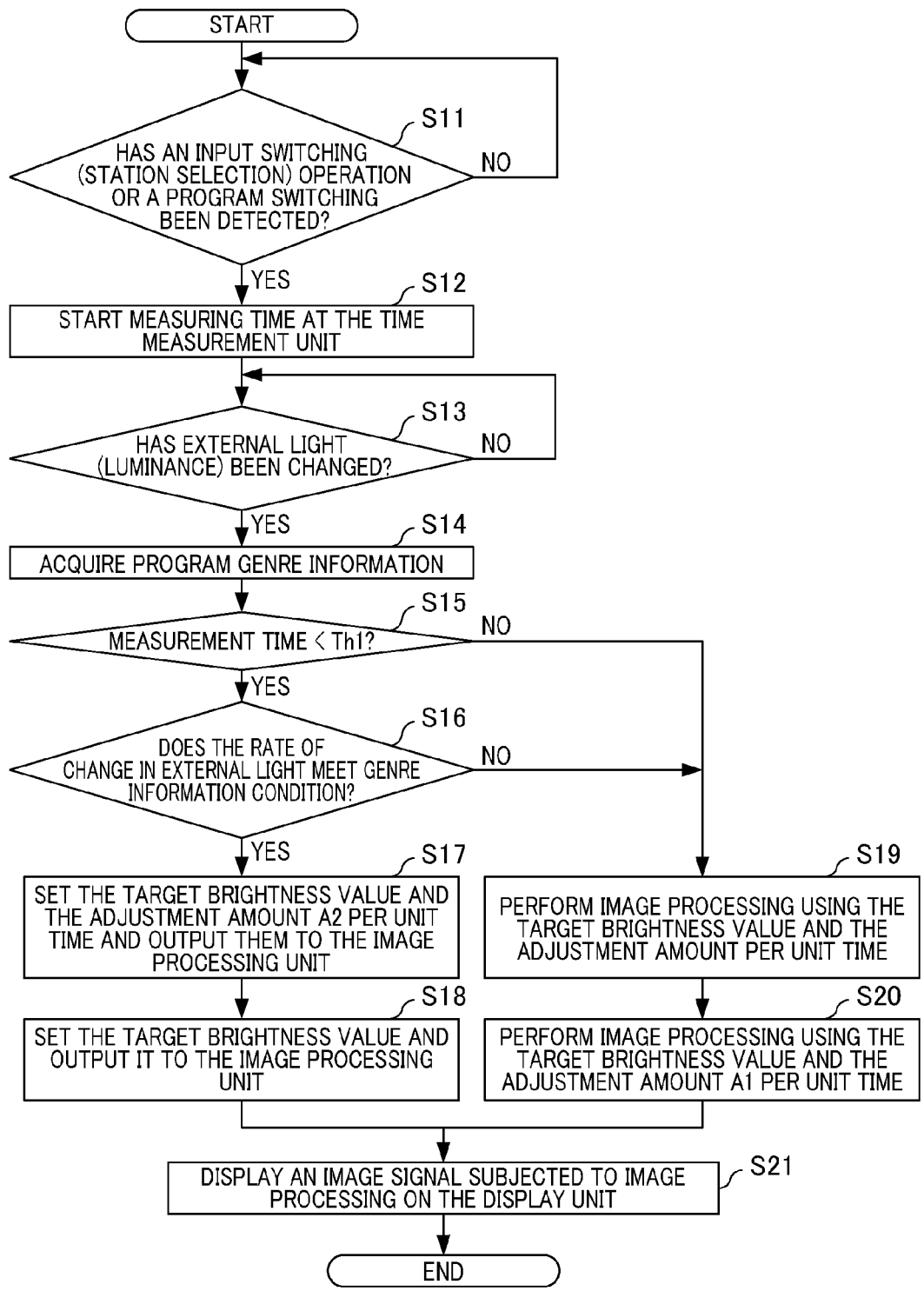
FIG. 5 is a diagram illustrating an example of an operation processing flow performed by the image processing apparatus according to the second embodiment.

Next, the operation processing flow performed by the image processing apparatus 200 according to the second embodiment will now be described with reference to FIG. 5. The steps S11 to S13, S15, and S17 to S21 in the operation processing flow shown in FIG. 5 are the same as the steps S1 to S3, S4, and S6 to S9 shown in FIG. 2, and explanation thereof will be omitted.

In step S13, when the external light change determination unit 103 detects a change in external light (illuminance), this information is transmitted to the control unit 105. First, the control unit 105 acquires the program genre information for the program that is currently being viewed. When the control unit 105 receives an input indicating that the illuminance has been changed from the external light change determination unit 103, the control unit 105 determines whether or not the elapsed time at a time point at which the input has occurred has reached the predetermined time threshold value Th1 (step S14). When the measurement time is equal to or longer than the time threshold value Th1, the control unit 105 advances the process to step S19.

When the external light change determination unit 103 detects a change in external light before the measurement time reaches the predetermined time threshold value Th1, the control unit 105 determines in step S16 whether or not the rate of change in external light meets the condition on the degree of change defined in the genre determination information. As used herein, the "rate of change in external light" refers to information indicating to which degree external light has changed within a certain time period. As described above, the program genre information is successively input from the program information acquisition unit 108 to the control unit 105. From this information, the control unit 105 determines the subsequent processing based on, for example, to which degree external light has been changed within the predefined time period since a movie program was displayed by the channel selection operation. When the rate of change in external light does not satisfy the condition defined in the genre information, the control unit 105 advances the process to step S19.

When the rate of change in external light meets the condition of the genre information, the control unit 105 sets the target brightness value from information about the detected changed illuminance to thereby make the adjustment amount per unit time of the brightness value for reaching the target brightness value a large value as in the first embodiment. In the second embodiment, image processing is performed by using an adjustment amount that is greater than the normal adjustment amount A1 but less than A2.

In the present embodiment described above, the condition for increasing the adjustment amount per unit time is defined as the rate of change in the predefined illuminance corresponding to the program genre. This allows for more accurate detection that a user has intentionally changed the light for a program genre in which light is often changed. In addition, when the degree of change in illuminance meets this condition, the adjustment amount per unit time is increased. Consequently, the image can be quickly shifted to the image state desired by the user, resulting in an increase in convenience to the user.

According to the image processing apparatus of the present invention, it becomes possible to execute the following processing in order to perform image quality adjustment processing with respect to an image signal step-by-step in accordance with a change in the lighting environment. Specifically, the image processing apparatus increases the adjustment amount per unit time so as to reduce the adjustment time for image quality suitable for the lighting environment after the change, when a user performs channel switching or when a user intentionally changes the lighting environment within a predetermined time after the change of the program that is currently being viewed. Consequently, the user convenience can be improved.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-205620 filed on Sep. 7, 2009, and Japanese Patent Application No. 2010-120147 filed on May 26, 2010 which are hereby incorporated by reference herein in their entirety.

What is claimed is:

1. An image processing apparatus that performs image quality adjustment processing on an image signal depending on external light, the image processing apparatus comprising:
    an external light detection unit configured to detect external light information including at least illuminance or color temperature so as to determine a change in external light depending on the detected external light information;
    a switching detection unit configured to detect any one of switching processes among switching the input of an image signal, channel switching, and broadcast program switching to the image processing apparatus;
    a measurement unit configured to measure the time that has elapsed since the switching process has been detected by the switching detection unit;
    a control unit configured to determine a target setting value to be used for image processing for displaying the image signal with an image quality corresponding to changed external light, when the external light detection unit recognizes that external light has been changed; and
    an image processing unit configured to execute image quality adjustment processing of the image step-by-step by using the target setting value determined by the control unit and an image quality adjustment amount per unit time until the image reaches an image quality corresponding to the target setting value,
    wherein the control unit determines based on the measurement result obtained by the measurement unit whether or not a change timing of external light detected by the external light detection unit is before a predetermined time has elapsed since the switching detection unit detected the switching process, and, when the change timing of external light is before the predetermined time has elapsed as a result of the determination, provides instructions to the image processing unit about executing image quality adjustment processing while increasing the adjustment amount per unit time.

2. The image processing apparatus according to claim 1, further comprising:
    an acquisition unit configured to acquire genre information indicating the type of contents of an image signal to be applied for image quality adjustment processing; and
    a storage unit configured to store determination information associating a condition value of the rate of change in external light with genre information,
    wherein the control unit provides instructions to the image processing unit about executing image quality adjustment processing while increasing the adjustment amount per unit time, when the change timing of external light is before the predetermined time has elapsed and the rate of change in external light before and after the switching process meets a condition value corresponding to genre information of the image signal after switching.

3. The image processing apparatus according to claim 1, wherein a plurality of the predetermined times is defined and the adjustment amount is defined such that the adjustment amount per unit time corresponding to the predetermined time is reduced as each predetermined time increases.

4. The image processing apparatus according to claim 1, further comprising:
    a display unit configured to display the image quality adjustment processed image.

5. A method for controlling an image processing apparatus that performs image quality adjustment processing on an image signal depending on external light, the method comprising:
    detecting external light information including at least illuminance or color temperature so as to determine the change in external light depending on the detected external light information;
    detecting any one of the switching processes among switching the input of an image signal, channel switching, and broadcast program switching to the image processing apparatus;
    measuring the time that has elapsed since the switching process has been detected;
    determining a target setting value to be used for image processing for displaying the image signal with an image quality corresponding to changed external light when the change in external light has been determined; and
    executing image quality adjustment processing of the image step-by-step by using the determined target setting value and an image quality adjustment amount per unit time until the image reaches an image quality corresponding to the target setting value, wherein determining the target setting includes determining whether or not a change timing of detected external light is before a predetermined time has elapsed since the switching process has been detected, and the image processing is controlled to execute image quality adjustment processing while increasing the adjustment amount per unit time when the change timing of detected external light is before the predetermined time has elapsed as a result of the determination.

6. The method for controlling an image processing apparatus according to claim 5, wherein the image processing apparatus further comprises a storage unit that stores determination information associating a condition value of the rate of change in external light with genre information, the method for controlling the image processing apparatus further comprising:

acquiring genre information indicating the type of contents of an image signal to be applied for image quality adjustment processing, wherein, during determining of the target setting, the image processing is controlled so as to execute image quality adjustment processing while increasing the adjustment amount per unit time when the change timing of detected external light is before the predetermined time has elapsed and the rate of change in detected external light before and after the switching process meets a condition value corresponding to the genre information of the image signal after switching.

7. The method for controlling an image processing apparatus according to claim 5, wherein a plurality of the predetermined times is defined and the adjustment amount is defined such that the adjustment amount per unit time corresponding to the predetermined time is reduced as each predetermined time increases.

8. The method for controlling an image processing apparatus according to claim 5, further comprising:

displaying the image quality adjustment processed image.

* * * * *